C. H. WEIGLE.
OILING-JOURNALS OF LOOSE-PULLEYS.
No. 194,199. Patented Aug. 14, 1877.
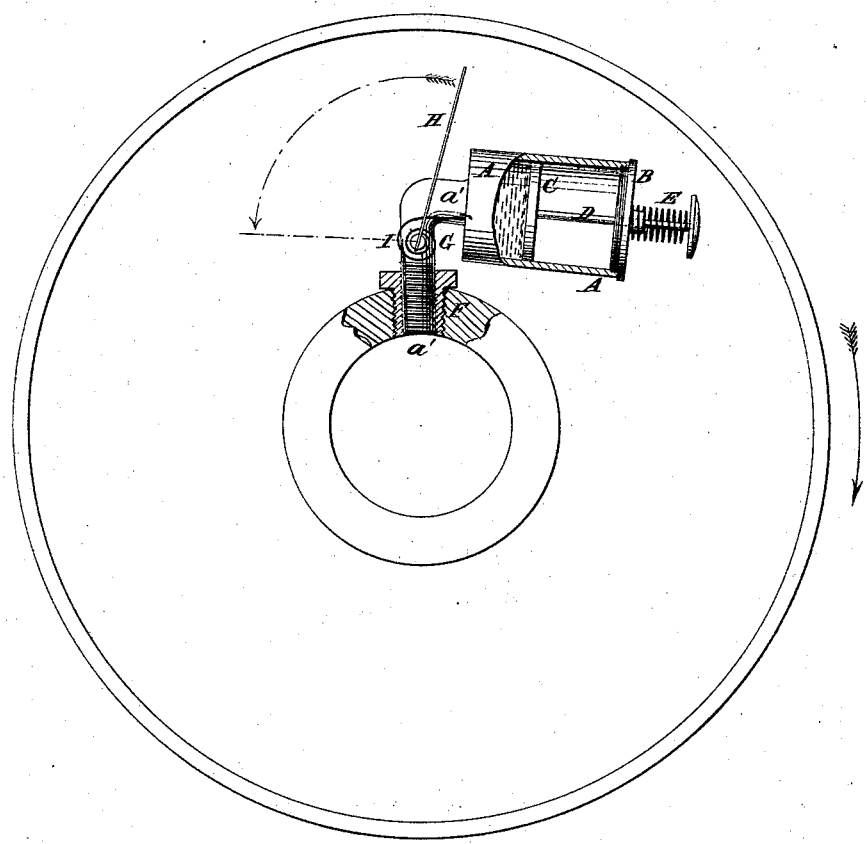

UNITED STATES PATENT OFFICE.

CHARLES H. WEIGLE, OF YORK, PENNSYLVANIA.

IMPROVEMENT IN OILING JOURNALS OF LOOSE PULLEYS.

Specification forming part of Letters Patent No. 194,199, dated August 14, 1877; application filed July 30, 1877.

*To all whom it may concern:*

Be it known that I, CHARLES H. WEIGLE, of York, in the county of York and State of Pennsylvania, have invented a new and useful Improvement in Device for Oiling the Journals of Loose Pulleys, of which the following is a specification:

The figure is a side view of my improved device, shown as applied to a pulley, parts being broken away to show the construction.

The object of this invention is to furnish an improved device for oiling the journals of loose pulleys while running, which shall be simple in construction, easily applied, and effective in operation.

The invention consists in the combination of the receiver, provided with the discharge-pipe and the screw-cap, the piston, piston-rod, and spring, the valve, fan, and spring, and the sleeve, having a right-hand screw-thread upon its outer surface, and a left-hand screw-thread upon its inner surface, with each other, to adapt the device to be applied to the hub of a loose pulley, as hereinafter fully described.

A represents the receiver in which the oil is placed, and which is provided with a screw-cap, B, so that it may be readily removed to put in oil. C is a piston fitted into the receiver A, and provided with a rod, D, which passes out through the cap B, and has a spring, E, connected with it of sufficient power to force the oil out of said receiver against the centrifugal force engendered by the revolution of the pulley. The forward end of the receiver A is provided with a discharge-pipe, $a'$, upon the end of which is cut a screw-thread, to fit into the screw-thread cut in the inner surface of the sleeve F, which has a screw-thread cut upon its outer surface, to screw into a screw-hole in the hub of the pulley.

The outer end of the sleeve F is made hexagonal or octagonal to receive a wrench, and its outer screw-thread is made right-hand and its inner screw-thread left-hand, so that it may be screwed into the hub and upon the discharge-pipe $a'$ at the same time.

The discharge-pipe $a'$ is provided with a valve, G, to the stem of which is attached a fan, H. The fan H is provided with a spring, I, of sufficient strength to bring the fan H back to its place, and close the valve G when the pressure is removed.

With this construction, when the pulley is revolved rapidly, the pressure of the air forces the fan H back, opens the valve G, and allows the oil to be forced out by the piston C D and spring E.

When the pulley ceases to revolve, the spring I brings the fan H to its former position, closes the valve G, and prevents any more oil from being forced out.

Having thus described my invention, I claim as new and desire to secure by Letters Patent—

The combination of the receiver A, provided with the discharge-pipe $a'$ and the screw-cap B, the piston, piston-rod, and spring C D E, the valve, fan, and spring G H I, and the sleeve F, having a right-hand screw-thread upon its outer surface, and a left-hand screw-thread upon its inner surface, with each other, to adapt the device to be applied to the hub of a loose pulley, substantially as herein shown and described.

CHARLES H. WEIGLE.

Witnesses:
PETER S. HOLLINGER,
LEVI STRICKLER.